J. H. DICKINSON.
Straw Cutter.
No. 65,355.
Patented June 4, 1867.
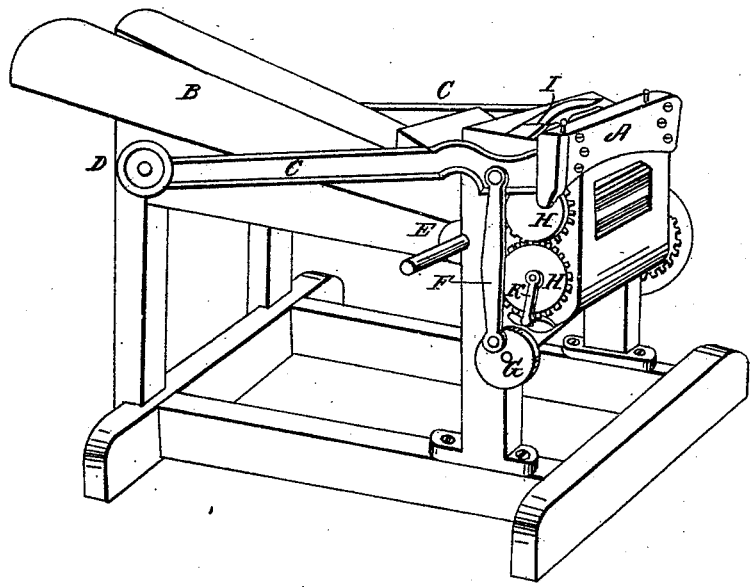
Witnesses.
B. Hosford.
W. H. Shattuck
Inventor:
John H. Dickinson

United States Patent Office.

JOHN H. DICKINSON, OF CHICOPEE FALLS, MASSACHUSETTS.

Letters Patent No. 65,355, dated June 4, 1867.

---

IMPROVEMENT IN HAY AND STRAW-CUTTER.

---

*The Schedule referred to in these Letters Patent and making part of the same.*

---

TO ALL WHOM IT MAY CONCERN:

Be it known that I, JOHN H. DICKINSON, of Chicopee Falls, in the county of Hampden, and State of Massachusetts, have invented a new and useful Improvement in a Machine for Cutting Hay, Straw, and other material; and I do hereby declare the following to be a full and exact description of the construction and operation of the same, reference being had to the accompanying drawings and letters of reference forming a part of this specification.

A represents the cutter-head; B represents the feed-hopper; C C represent two levers attached to the cutter-head and running backward on each side of the feed-hopper to the fixed shaft D, on which they rotate, as the cutter rises and falls; E represents the balance-wheel shaft, which is geared to the shaft G; F represents the connections by which the cutter is operated; H H are geared together and operate the feed-rolls with intermittent motion, that motion being communicated from the wheel G by means of the swing-catch K.

What I claim as my invention, and desire to secure by Letters Patent, is—

A device for cutting wherein the cutter shall rise and fall on the arc of a circle, using for that purpose the levers C C, the cutter A, the connections F, the shaft G, and the swing-catch K, in combination.

JOHN H. DICKINSON.

Witnesses:
   B. HOSFORD,
   W. H. SHATTUCK.